US012744276B2

(12) United States Patent
Yang et al.

(10) Patent No.: US 12,744,276 B2
(45) Date of Patent: Sep. 22, 2026

(54) BATTERY CASE, BATTERY MODULE, BATTERY PACK, AND VEHICLE INCLUDING THE BATTERY CASE, AND METHOD OF MANUFACTURING THE BATTERY CASE

(71) Applicant: LG ENERGY SOLUTION, LTD., Seoul (KR)

(72) Inventors: Kun-Joo Yang, Daejeon (KR); Seog-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 213 days.

(21) Appl. No.: 18/282,669

(22) PCT Filed: Oct. 14, 2022

(86) PCT No.: PCT/KR2022/015659
§ 371 (c)(1),
(2) Date: Sep. 18, 2023

(87) PCT Pub. No.: WO2023/068682
PCT Pub. Date: Apr. 27, 2023

(65) Prior Publication Data

US 2024/0162554 A1 May 16, 2024

(30) Foreign Application Priority Data

Oct. 22, 2021 (KR) ........................ 10-2021-0142194

(51) Int. Cl.
*H01M 50/278* (2021.01)
*B29C 45/14* (2006.01)
(Continued)

(52) U.S. Cl.
CPC ..... *H01M 50/278* (2021.01); *B29C 45/14008* (2013.01); *H01M 50/213* (2021.01);
(Continued)

(58) Field of Classification Search
CPC ............. H01M 50/213; H01M 50/249; H01M 50/278; B29C 45/14008; B29L 2031/7146
See application file for complete search history.

(56) References Cited

U.S. PATENT DOCUMENTS 10,446,812 B2 10/2019 Kim et al.
2015/0243946 A1 8/2015 Ahn
(Continued)

FOREIGN PATENT DOCUMENTS

CN 210182432 U 3/2020
CN 112873710 A 6/2021
(Continued)

OTHER PUBLICATIONS

Office Action dated Feb. 12, 2025 issued in corresponding Japanese Patent Application No. 2024-505426.
(Continued)

*Primary Examiner* — Brittany L Raymond
(74) *Attorney, Agent, or Firm* — Morgan, Lewis & Bockius LLP

(57) ABSTRACT

Provided are a battery case, a battery module, a battery pack, and a vehicle including the battery case, and a method of manufacturing the battery case. A battery case according to an embodiment includes a lower case in which a plurality of battery cells are accommodated, and an upper case coupled to the lower case, wherein an insert nut is provided in at least one of the upper case and the lower case, a pinhole is formed at a position adjacent to the insert nut of the at least one of the upper case and the lower case, and the pinhole is blocked.

13 Claims, 4 Drawing Sheets

(51) Int. Cl.
*B29L 31/00* (2006.01)
*H01M 50/213* (2021.01)
*H01M 50/249* (2021.01)

(52) U.S. Cl.
CPC ... *H01M 50/249* (2021.01); *B29L 2031/7146* (2013.01); *H01M 2220/20* (2013.01)

(56) References Cited

U.S. PATENT DOCUMENTS

| | | | | |
|---|---|---|---|---|
| 2019/0148799 | A1 | 5/2019 | Lim et al. | |
| 2020/0280035 | A1 * | 9/2020 | Park | H01M 10/62 |

FOREIGN PATENT DOCUMENTS

| | | | |
|---|---|---|---|
| EP | 4027441 | A1 | 7/2022 |
| JP | S49-82440 | A | 8/1974 |
| JP | H07220558 | A | 8/1995 |
| JP | H08321239 | A | 12/1996 |
| JP | 10-037940 | A | 2/1998 |
| JP | 2004-040945 | A | 2/2004 |
| JP | 2005-295628 | * | 10/2005 |
| JP | 2005-295628 | A | 10/2005 |
| JP | 2006-142513 | A | 6/2006 |
| JP | 2018-006285 | A | 1/2018 |
| JP | 2020-533773 | A | 11/2020 |
| KR | 10-1997-0054699 | A | 7/1997 |
| KR | 20-0377626 | Y1 | 3/2005 |
| KR | 10-2008-0013648 | A | 2/2008 |
| KR | 10-0934639 | B1 | 12/2009 |
| KR | 10-0997043 | B1 | 11/2010 |
| KR | 10-1301709 | B1 | 8/2013 |
| KR | 10-2013-0107088 | A | 10/2013 |
| KR | 10-2015-0098831 | A | 8/2015 |
| KR | 10-2018-0097802 | A | 9/2018 |
| KR | 10-2054413 | B1 | 12/2019 |
| KR | 10-2021-0087814 | A | 7/2021 |

OTHER PUBLICATIONS

International Search Report (with partial translation) and Written Opinion, dated Jan. 26, 2023, for corresponding PCT International Application No. PCT/KR2022/015659.

Extended European Search Report dated Jan. 14, 2025 issued in corresponding European Patent Application No. 22883905.6. 1. Note: KR 10-2021-0087814 A cited in this EESR was cited in a previously-filed IDS.).

Office Action dated Jul. 30, 2026 issued in corresponding Chinese Patent Application No. 202280024627.3. (Note: US 2020/0280035 A1, JP 2005-295628 A, and KR 10-2021-0087814 A cited in this CN Office Action have already been cited in prior IDSs and considered.).

* cited by examiner

BATTERY CASE, BATTERY MODULE, BATTERY PACK, AND VEHICLE INCLUDING THE BATTERY CASE, AND METHOD OF MANUFACTURING THE BATTERY CASE

The present application is a U.S. National Stage of PCT International Application No. PCT/KR2022/015659, filed on Oct. 14, 2022, which claims priority to Korean Patent Application No. 10-2021-0142194, filed on Oct. 22, 2021, in the Republic of Korea, the disclosures of which are incorporated herein by reference.

TECHNICAL FIELD

The present application claims priority to Korean Patent Application No. 10-2021-0142194, filed on Oct. 22, 2021, in the Republic of Korea, the disclosures of which are incorporated herein by reference.

The present disclosure relates to a battery case, a battery module, a battery pack, and a vehicle including the battery case, and a method of manufacturing the battery case, and more particularly, to a battery case with improved waterproof performance, a battery module, a battery pack, and a vehicle including the battery case, and a method of manufacturing the battery case.

BACKGROUND ART

As the development and demand for mobile devices has increased, the demand for secondary batteries as energy sources has rapidly increased. Nickel cadmium batteries or hydrogen ion batteries have been used as conventional secondary batteries, but recently, lithium secondary batteries having little memory effect compared to nickel-based secondary batteries, free charging and discharging, a very low self-discharge rate, and high energy density have been widely used.

A lithium secondary battery mainly uses a lithium-based oxide and a carbon material as a positive electrode active material and a negative electrode active material, respectively. A lithium secondary battery includes a secondary battery cell in which a positive electrode plate and a negative electrode plate coated with a positive electrode active material and a negative electrode active material are located with a separator therebetween, and a casing in which the secondary battery cell is air-tightly accommodated with an electrolyte, that is, a battery case.

A lithium secondary battery includes a positive electrode, a negative electrode, a separator located between the positive electrode and the negative electrode, and an electrolyte, and is divided into a lithium-ion battery (LIB), a lithium polymer battery (PLM), and so on according to which of a positive electrode active material and a negative electrode active material is used. In general, an electrode of a lithium secondary battery is formed by applying a positive electrode or negative electrode active material to a current collector such as an aluminum or copper sheet, a mesh, a film, or a foil and then drying the same. Various types of secondary batteries include a case for protecting a battery cell, a battery module in which a plurality of battery cells are accommodated in the case, and a battery pack in which a plurality of battery modules are included.

In this case, a waterproof grade is determined according to a degree of waterproofing of the case, and when the waterproof grade is high, it is necessary to prevent water leakage through the case.

DISCLOSURE

Technical Objective

Therefore, a technical object of the present disclosure is to provide a battery case having improved waterproof performance by preventing water leakage of a case, a battery module, a battery pack, and a vehicle including the battery case, and a method of manufacturing the battery case.

Technical Solution

According to an aspect of the present disclosure, there is provided a battery case including a lower case in which a plurality of battery cells are accommodated, and an upper case coupled to the lower case, wherein an insert nut is provided in at least one of the upper case and the lower case, a pinhole is formed at a position adjacent to the insert nut of the at least one of the upper case and the lower case, and the pinhole is blocked.

The pinhole may be formed by a pin for supporting the insert nut in manufacturing at least one of the upper case and the lower case.

At least one of the upper case and the lower case may be manufactured by a mold, the pin may be formed in the mold itself, and at least one of the upper case and the lower case may be formed by injection molding of plastic and the insert nut formed of a metal material.

A protrusion may be formed on an inner surface of at least one of the upper case and the lower case, and the pinhole may be formed in the protrusion, wherein a heating member heats the protrusion to seal the pinhole.

According to another aspect of the present disclosure, there are provided a battery module including the battery case, a battery pack including the battery case, and a vehicle including the battery case.

According to another aspect of the present disclosure, there is provided a method of manufacturing a battery case, the method including locating an insert nut formed of a metal material on a plastic material, manufacturing at least one of a lower case in which a plurality of battery cells are accommodated and an upper case coupled to the lower case, by using injection molding using a mold, forming a pinhole at a position adjacent to the insert nut, and blocking the pinhole.

The pinhole may be formed by a pin formed in the mold itself to support the insert nut.

The method may further include forming a protrusion on an inner surface of at least one of the upper case and the lower case, and forming the pinhole in the protrusion.

The method may further include heating, by a heating member, the protrusion to seal the pinhole.

Advantageous Effects

According to example embodiments of the present disclosure, a pinhole formed in a case is blocked to prevent water leakage of a case, and thus, waterproof performance is improved.

MODES FOR PRACTICING THE DISCLOSURE

Figure 1:
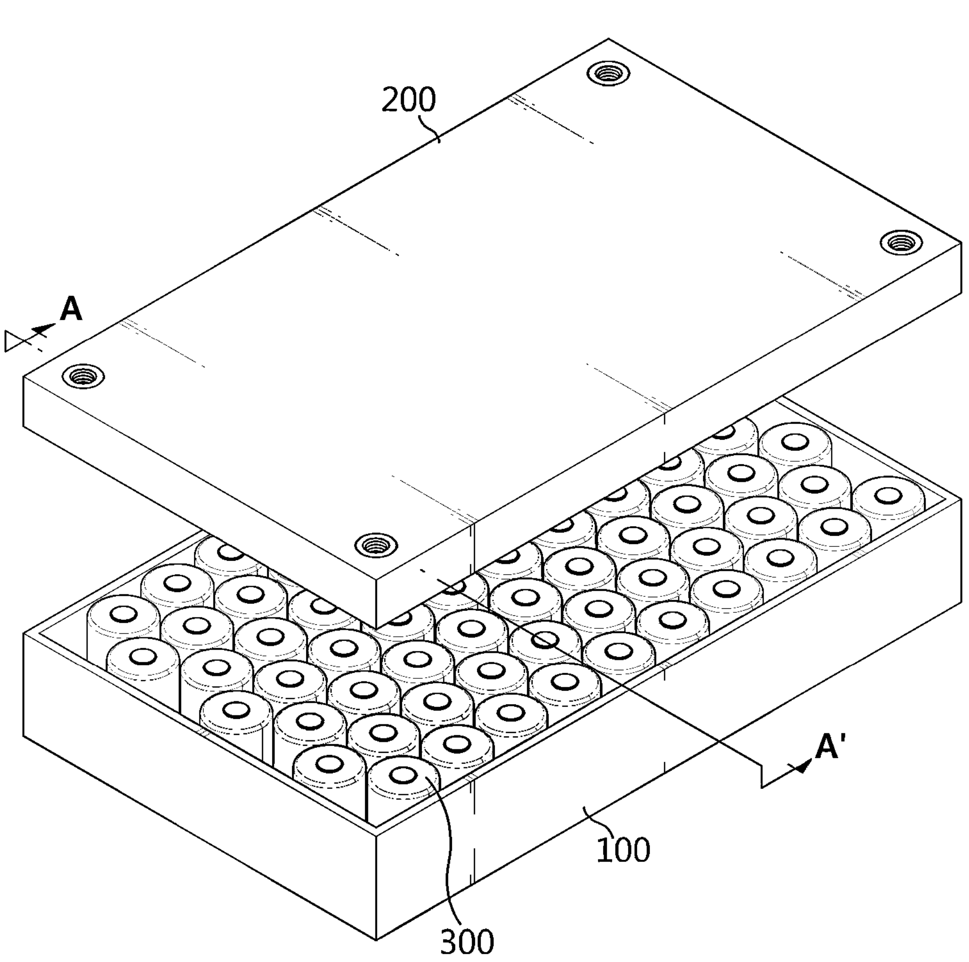
FIG. 1 is an overall perspective view schematically illustrating a battery case according to an example embodiment of the present disclosure.

Hereinafter, preferred example embodiments of the present disclosure will be described in detail with reference to the accompanying drawings. It should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The size of each element or a specific portion of the element shown in the drawings may be exaggerated, omitted, or schematically drawn for the purpose of convenience and clarity of explanation. Accordingly, the size of each element may not substantially reflect its actual size. While describing the present disclosure, detailed descriptions of related well-known functions or configurations that may blur the points of the present disclosure are omitted.

Also, in the present specification, it will be understood that when elements are "coupled" or "connected" to each other, the elements may be directly coupled or connected to each other, or may be indirectly coupled or connected to each other with an intervening element therebetween.

Figure 2:
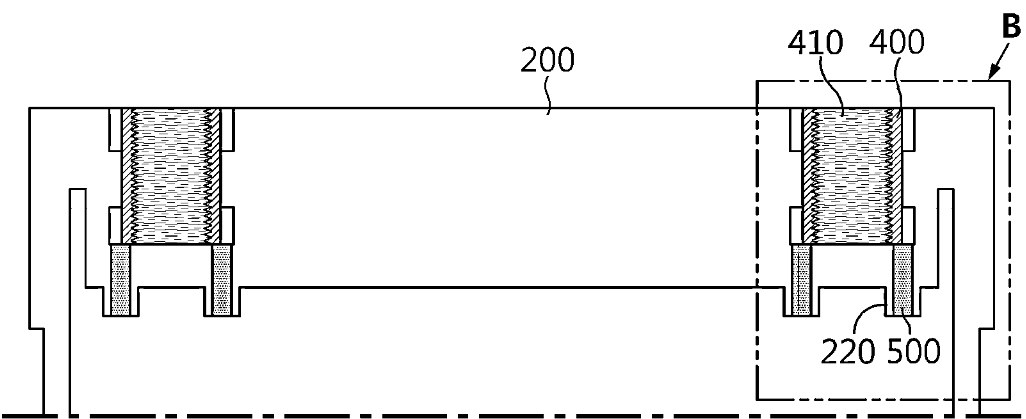
FIG. 2 is a cross-sectional view taken along line A-A' of FIG. 1.
Figure 3:
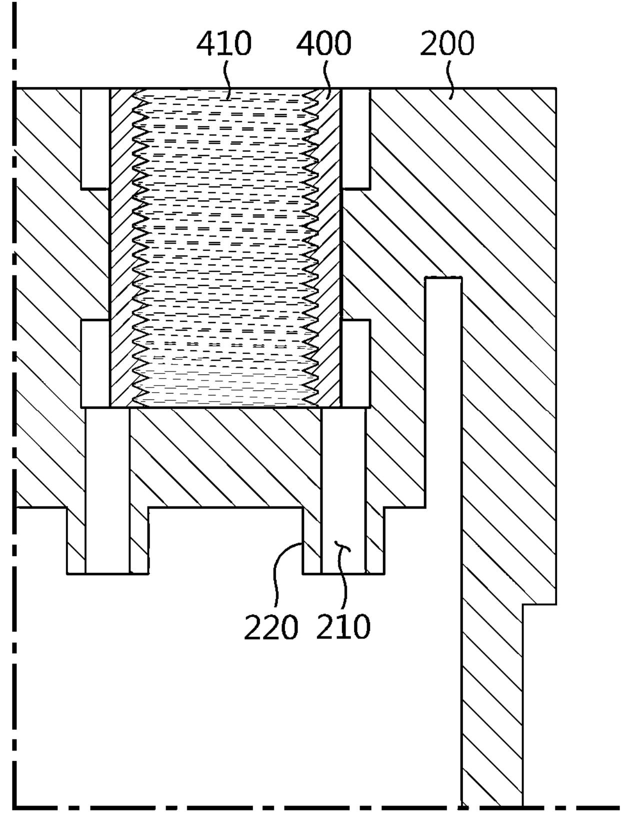
FIG. 3 is an enlarged view illustrating a portion B of FIG. 2, specifically illustrating a state where a pin of FIG. 2 is removed.
Figure 4:
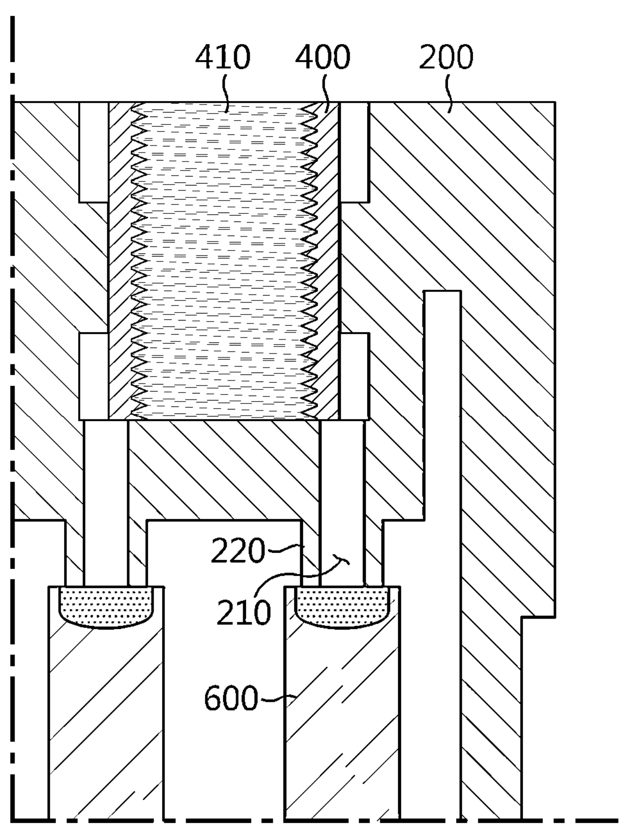
FIGS. 4 and 5 are views illustrating a process of blocking a pinhole of a battery case according to an example embodiment of the present disclosure.
Figure 5:
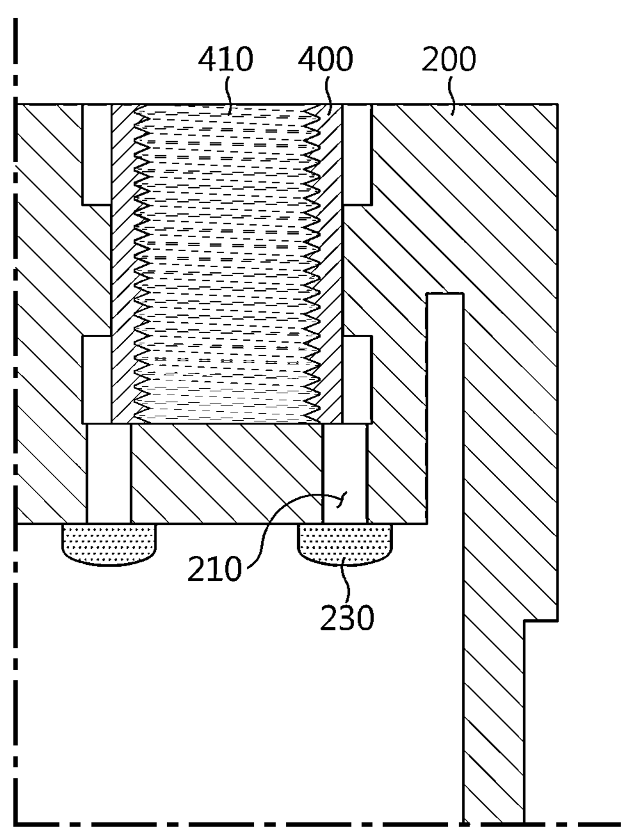

FIG. 1 is an overall perspective view schematically illustrating a battery case according to an example embodiment of the present disclosure. FIG. 2 is a cross-sectional view taken along line A-A' of FIG. 1. FIG. 3 is an enlarged view illustrating a portion B of FIG. 2, specifically illustrating a state where a pin of FIG. 2 is removed. FIGS. 4 and 5 are views illustrating a process of blocking a pinhole of a battery case according to an example embodiment of the present disclosure.

With reference to FIGS. 1 to 5, a battery case according to an example embodiment of the present disclosure includes a lower case 100 and an upper case 200.

With reference to FIG. 1, a plurality of battery cells 300 are accommodated in the lower case 100. The upper case 200 is coupled to the lower case 100.

The battery cell 300 may be a cylindrical, prismatic, or pouch-type cell. However, for convenience of explanation, the following will be described assuming that the battery cell 300 is a cylindrical cell.

The battery cell 300 that is a cylindrical cell includes an electrode assembly, for example, a jelly-roll type electrode assembly, a cylindrical housing in which an electrolyte is accommodated together with the electrode assembly, a positive electrode terminal formed on, for example, an upper portion of the housing, and a negative electrode terminal formed on, for example, a lower portion of the housing.

The electrode assembly may have a structure in which a positive electrode and a negative electrode are stacked with a separator therebetween and wound in a jelly-roll shape, and a positive electrode lead (not shown) is attached to the positive electrode to be connected to the positive electrode terminal on the upper portion of the housing and a negative electrode lead (not shown) is attached to the negative electrode to be connected to the negative electrode terminal on the lower portion of the housing. A cylindrical center pin (not shown) may be inserted into a central portion of the electrode assembly. The center pin (not shown) may fix and support the electrode assembly and may function as a passage through which gas generated by an internal reaction during operation and charging/discharging is discharged.

The upper case 200 and the lower case 100 may entirely surround the battery cells 300 to protect the battery cells 300 from external vibration or impact.

The upper case 200 and the lower case 100 may be formed in any of various shapes, for example, a hexahedral shape. However, a shape of the upper case 200 and the lower case 100 is not limited thereto.

The upper case 200 and the lower case 100 may be manufactured by plastic injection molding. The upper case 200 and the lower case 100 may be manufactured as an integrated type or manufactured as a separated type.

A through-portion (not shown) through which a connector element or a terminal element may be exposed to the outside may be formed in the upper case 200 and the lower case 100. That is, the connector element or the terminal element may be electrically connected to a certain external component or member, and the through-portion may be formed in the upper case 200 or the lower case 100 so that the electrical connection is not disturbed by the upper case 200 and the lower case 100.

An insert nut 400 may be provided in at least one of the upper case 200 and the lower case 100. For convenience of explanation, the following will be described assuming that the insert nut 400 is provided in the upper case 200. However, the scope of the present disclosure is not limited by the description.

The insert nut 400 may be provided in the upper case 200 by using any of various methods. For example, the upper case 200 may be formed by injection molding of plastic and the insert nut 400 formed of a metal material. For example, the upper case 200 may be manufactured by injection molding using a mold.

In this case, the insert nut 400 may move from a pre-set position due to injection pressure during injection molding, thereby resulting in a defect. To prevent this problem, a pin 500 formed in the mold itself may be provided to support the insert nut 400.

That is, with reference to FIG. 2, the pin 500 formed in the mold itself to prevent a defect during injection molding supports the insert nut 400. The number of pins 500 may vary. In FIG. 2, the mold is not shown and only the pin 500 is shown.

With reference to FIG. 3, when injection molding is completed, the mold is removed, the pin 500 formed in the mold itself is also removed, and thus, a pinhole 210 is formed at a position adjacent to the insert nut 400 of the upper case 200, for example, a position of the pin 500 that supports the insert nut 400 in the upper case 200.

That is, the pinhole 210 is formed by the pin 500 formed in the mold itself to support the insert nut 400 in manufacturing the upper case 200 using injection molding.

When waterproofing is not required for a case, it is not a problem even when the pinhole 210 is formed in the upper case 200 after injection molding is completed. However, when a case of a waterproof grade is manufactured, because water leakage may occur through the pinhole 210, the pinhole 210 should be blocked.

That is, the battery case according to an example embodiment of the present disclosure may be used without blocking the pinhole 210 when waterproofing is not necessary but should be used after blocking the pinhole 210 when waterproofing is necessary.

With reference to FIG. 3, a protrusion 220 may be formed on an inner surface of the upper case 200, and the pinhole 210 may be formed in the protrusion 220. With reference to FIG. 4, a heating member 600 seals the pinhole 210 by heating the protrusion 220 to form a sealing portion 230. The heating member 600 may be, but is not limited to, a heat welding rod.

That is, when the heating member 600 heats and presses the protrusion 220, the protrusion 220 melts and the sealing portion 230 for sealing the pinhole 210 is formed as shown in FIG. 5. Accordingly, water leakage through the pinhole 210 is prevented, thereby improving waterproof performance.

A battery module (not shown) according to an example embodiment of the present disclosure may include the battery case including the lower case 100 and the upper case 200 according to an example embodiment of the present disclosure as described above. As described above, a plurality of battery cells 300 may be accommodated in the battery case including the lower case 100 and the upper case 200 to form the battery module.

A battery pack (not shown) according to an example embodiment of the present disclosure may include the battery case including the lower case 100 and the upper case 200 according to an example embodiment of the present disclosure. Also, the battery pack according to an example embodiment of the present disclosure may include one or more battery modules. The battery pack may further include a housing for accommodating the battery module, and various devices for controlling charging/discharging of the battery module, for example, a battery management system (BMS), a current sensor, and a fuse.

A vehicle (not shown) according to an example embodiment of the present disclosure may include the battery case including the lower case 100 and the upper case 200 according to an example embodiment of the present disclosure. Also, the vehicle according to an example embodiment of the present disclosure may include the battery module or the battery pack, and the battery pack may include the battery module. The vehicle includes a certain vehicle provided to use electricity such as an electric vehicle or a hybrid vehicle.

An operation and effect of a method of manufacturing a battery case according to an example embodiment of the present disclosure will be described with reference to the drawings.

The description of the same parts as in the above may be applied to a method of manufacturing a battery case, and the description of the same parts as in the method of manufacturing a battery case may be applied to the battery case, the battery module, the battery pack, and the vehicle.

First, the insert nut 400 formed of a metal material is located on a plastic material. The insert nut 400 may be formed of any of various types of metals, and a thread 410 is formed on an inner surface of the insert nut 400.

Next, a mold is prepared, and the upper case 200 is manufactured by using injection molding of different materials of plastic and metal. As described above, the upper case 200 will be mainly described even in the method of manufacturing a battery case.

Next, when the mold is removed, the pinhole 210 is formed at a position adjacent to the insert nut 400. The pinhole 210 is formed by the pin 500 formed in the mold itself, and the pin 500 is provided support the insert nut 400 during injection molding.

The protrusion 220 is formed on an inner surface of the upper case 200, and the pinhole 210 is formed in the protrusion 220.

Next, the pinhole 210 is blocked by any of various methods. For example, as shown in FIG. 4, the heating member 600 heats the protrusion 220 to seal the pinhole 210 as shown in FIG. 5.

The pinhole formed in the case is blocked in this manner to prevent water leakage of the case, thereby improving waterproof performance.

Although the example embodiments of the present disclosure have been illustrated and described above, the present disclosure is not limited to the above-described specific example embodiments. Various modified embodiments may be made by one of ordinary skill in the art without departing from the scope of the present disclosure as claimed in the claims.

INDUSTRIAL APPLICABILITY

The present disclosure relates to a battery case, a battery module, a battery pack, and a vehicle including the battery case, and a method of manufacturing the battery case, and is particularly applicable to industries related to secondary batteries.

What is claimed is:

1. A battery case, comprising:

a lower case accommodating a plurality of battery cells; and an upper case coupled to the lower case, wherein at least one of the upper case and the lower case includes:

an insert nut extending in a first direction in the at least one of the upper case and the lower case; and a pinhole extending in the first direction from an end of the insert nut in the at least one of the upper case and the lower case, and wherein the pinhole is blocked.

2. The battery case according to claim 1, wherein the pinhole is formed by a pin for supporting the insert nut in forming the at least one of the upper case and the lower case.

3. The battery case according to claim 2, wherein:

the at least one of the upper case and the lower case includes an injection molded plastic with the insert nut, the pin is formed in a mold used to form the injection molded plastic, and the insert nut is formed of a metal material.

4. The battery case according to claim 1, wherein:

the one of the upper case and the lower case further includes a protrusion formed on an inner surface of the at least one of the upper case and the lower case and protruding away from the insert nut in the first direction, and the pinhole is formed in the protrusion and is sealed at an end of the protrusion away from the insert nut.

5. The battery case of claim 1, wherein the upper case and the lower case together are configured to entirely surround the battery cells.

6. The battery case of claim 1, wherein:

the pinhole is formed in an inner surface of the at least one of the upper case and the lower case, and an end of the pinhole away from the insert nut is sealed.

7. The battery case of claim 1, wherein the at least one of the upper case and the lower case further includes at least one other pin hole extending in the first direction from the end of the insert nut in the at least one of the upper case and the lower case.

8. The battery case of claim 1, wherein the first direction is a vertical direction.

9. The battery case of claim 1, wherein:

one end of the pinhole is blocked at least partially by the end of the insert nut; and the other end of the pinhole away from the insert nut is sealed.

10. The battery case of claim 1, wherein:

the insert nut extends in the first direction from an outer surface of the at least one of the upper case and the lower case to the end of the insert nut away from the outer surface of the at least one of the upper case and the lower case.

11. A battery module comprising the battery case according to claim 1.

12. A battery pack comprising the battery case according to claim 1.

13. A vehicle comprising the battery case according to claim 1.

* * * * *